United States Patent [19]

Lauder et al.

[11] Patent Number: 4,815,980

[45] Date of Patent: Mar. 28, 1989

[54] COMBINED CHASSIS RETENTION AND ELECTRICAL CONTACT ARRANGEMENT

[75] Inventors: James V. Lauder, Sunrise; Robert B. Burchett, Boca Raton; David H. Karl, Tamarac, all of Fla.

[73] Assignee: Motorola, Inc., Schaumburg, Ill.

[21] Appl. No.: 152,727

[22] Filed: Feb. 5, 1988

[51] Int. Cl.⁴ ............................................ H01R 13/62
[52] U.S. Cl. ................................ 439/76; 439/346; 439/366; 439/627
[58] Field of Search .................. 439/76, 95–97, 439/297–298, 345–346, 366, 544, 627; 429/96, 99, 100

[56] References Cited

U.S. PATENT DOCUMENTS

| | | | |
|---|---|---|---|
| 4,391,882 | 7/1983 | Saruwatari | 429/96 |
| 4,417,776 | 11/1983 | Motoyama | 439/76 |
| 4,718,742 | 1/1988 | Utoh et al. | 439/627 |
| 4,726,789 | 2/1988 | Yaffe | 439/627 |

*Primary Examiner*—John McQuade
*Attorney, Agent, or Firm*—Donald B. Southard; Anthony J. Sarli, Jr.

[57] ABSTRACT

A spring clip arrangement is disclosed for a portable battery powered device which provides an efficient chassis retention feature for a slideably removable electrical chassis in unassociated housing. This retention is accomplished without machine screws and no special tools required. This spring clip arrangement also serves as the electrical contact interface for the associated battery power source insertable in a provided battery compartment.

7 Claims, 1 Drawing Sheet

COMBINED CHASSIS RETENTION AND ELECTRICAL CONTACT ARRANGEMENT

BACKGROUND OF THE INVENTION

This invention relates generally to chassis assembly and retention thereof in an associated housing and, more particularly, to a multi-functional spring clip arrangement for such chassis retention which may further serve as the electrical contact interface between a battery power source and such chassis assembly.

Portable hand-held devices, such as portable two-way radio transceivers, customarily include a chassis assembly comprised of the electrical and/or electronic components assembled into operational circuitry to effect the intended signal processing functions. They also necessarily include an associated battery power source to provide the necessary operating power to such circuitry. The battery and the chassis are normally contained within separate compartments in an overall associated housing. The battery more often than not includes a slideably removable cover for quick access. On the other hand, radio chassis assembly does not ordinarily require quick nor frequent access but, nevertheless, some sort of chassis retention is to be provided.

There are, of course, a myriad of chassis retention arrangements known in the prior art. That is so even when considering only portable two-way radio devices.

Perhaps, the most commonly encountered contrivances for chassis retention are mechanical fasteners of one sort or another, such as machine screws. As such, they exhibit a number of disadvantages. They require considerable time and effort for manipulation in attachment and removal. They must be accessible from the exterior for manipulation by separate tooling devices, such as screw drivers or the like. However, they frequently loosen over a period of time. If mating with a non-metallic part, "plastic creep" may well occur giving rise to the aforementioned undesirable loosening.

Moreover, each individual retaining screw is but yet another piece part. Design efficiency dictates minimizing piece part quantity as much as possible without sacrificing quality. This can be most easily effected by designing in multi-functionality of component parts wherever feasible. However, it has been proven that screw parts are not well suited to providing electrical contact in many cases.

SUMMARY OF THE INVENTION

Accordingly, it is an object of the present invention to provide a chassis retention arrangement which overcomes the foregoing deficiencies.

A more particular object of the present invention is to provide a chassis retention arrangement of the foregoing type which avoids the use of screw parts and, further, serves as the electrical contact interface between the associated battery power source and the radio chassis assembly.

In practicing the invention, the portable radio device includes a housing wherein a slideably insertable chassis assembly may be placed and wherein hand removable spring clips are provided to retain the chassis within the housing. Moreover, these spring clips are designed to further serve as electrical contacts between associated batteries, serving as the operating power source and also insertable within the housing, and electrical chassis assembly itself.

BRIEF DESCRIPTION OF THE DRAWINGS

The features of the present invention which are believed to be novel are set forth with particularity in the appended claims. The invention, itself, together with further objects and advantages thereof, may be best understood by reference to the accompanying drawings, in which:

BRIEF DESCRIPTION OF THE PREFERRED EMBODIMENT

Figure 1:
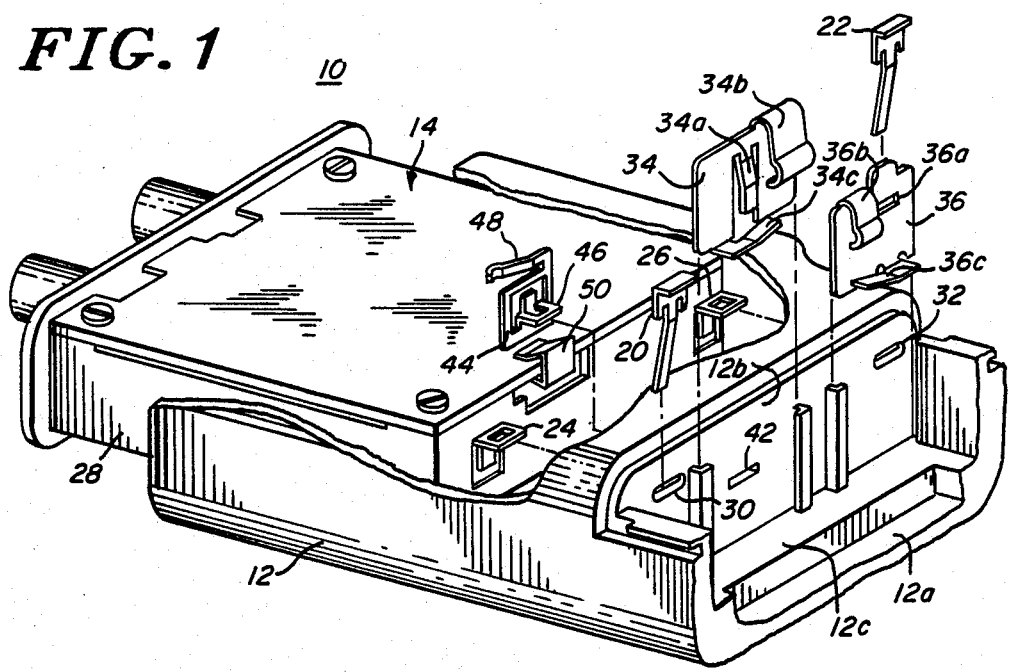
FIG. 1 is an exploded, fragmentary and partially broken away view in perspective of a two-way radio assembly constructed in accordance with the present invention.

Referring now to the drawings, a portable two-way radio apparatus 10 is shown in FIG. 1 which has been constructed in accordance with the present invention. The radio design includes a housing 12 in which an electrical chassis 14 is slideably retained as well as a battery power source (not specifically shown) insertable in an associated battery compartment 12a (best seen in FIG. 2).

Chassis assembly 14 is designed to include all of the electrical and electronic component parts and circuitry which in operation provide the desired signal processing functions. This chassis assembly must be retained within the housing and in contact, at least electrically, with the associated battery power source to function as intended. However, the chassis assembly must also be removable to permit access for repair, adjustment or the like. This dictates the provision of some sort of releasable retention capability for the chassis assembly. As mentioned previously, the use of conventional fasteners such as mechanical or machine screws has not prove satisfactory for the reasons stated.

Chassis retention in accordance with the present invention is effected by, inter alia, the spring clips 20 and 22 in conjunction with chassis retainer links 24 and 26. Links 24 and 26 may be separate parts suitably affixed to the frame 28 or they may be formed from chassis frame 28 itself such as by punching out and bending in a horizontal position substantially as indicated in FIG. 1. When chassis assembly 14 is slideably inserted fully within housing 12, links 24 and 26 insert into and slightly beyond apertures 30 and 32, respectively, in the partition wall 12b. Spring clips 20 and 22 may then be inserted through the chassis retention links 24 and 26 (best seen in FIG. 2). This retains chassis assembly 14 within housing 12 without screws or other fasteners being required. Chassis assembly 14 is freed by the simple removal of spring clips 20 and 22, even without auxiliary tools, which then allows the chassis to be pulled from the housing 12 for access.

Figure 2:
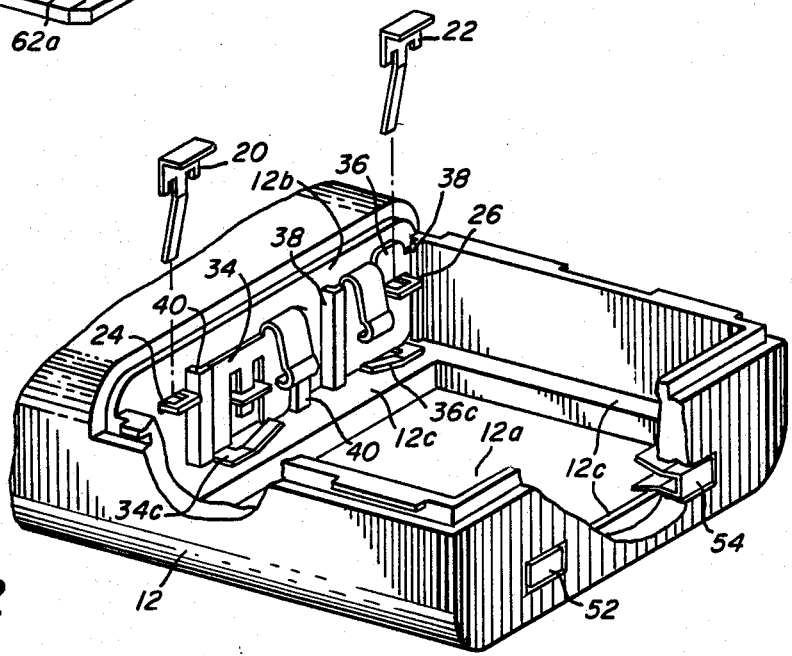
FIG. 2 is an exploded, fragmentary and partially broken away view in perspective of the spring clip arrangement which provides the chassis retention feature and the electrical contact terminals for the battery wherein the battery terminals have been slideably retained with slotted supports.

As will be noted, still other spring clip parts are also included in addition to the above referenced. These additional spring clips members separately, or in combination with the previously described clip devices, provide the necessary interface between the electrical chassis 14 and the battery power source (not specifically shown), insertable in battery compartment 12a. This interface is in the form of a suitable electrical contact assembly with electrical contact terminals formed by spring clips 34 and 36 serving to contact the associated battery power source directly and function as respective positive and negative terminals. In the case shown, clip 34 serves as the positive terminal and clip 36 the negative. Spring clip terminals 34 and 36 are intended to slideably insert between the partition wall 12b and the overhang of a respective pair of support posts 38 and 40, substantially as shown in FIG. 2. Spring clip terminal 36 further includes an aperture or slot 36a which aligns with slot 32 in partition wall 12b. Accordingly, chassis retainer link 26 extends through both slots 32 and 36a and is retained in this position by the insertion of spring clip 22. In this way spring clip members 22 and 36 serve a multi-function purpose. As such, they provide a portion of the chassis retention function as well as serving as the negative terminal for the insertable battery power source in battery compartment 12a. As will be noted, spring clip terminal 36 further includes a resilient downwardly extending arm or finger 36b in cantilever fashion that provides the spring contact to which the battery terminal physically and electrically contacts.

Further, spring clips 22 and 36 serve still an additional function. Since retainer link 26 is an integral part of chassis frame 28, terminal 36 is operative to connect the negative terminal of the associated battery power source to the chassis frame and thereby serve as chassis ground. No other wiring or connections are required.

In a similar fashion, spring clip terminal 34 serves as the positive terminal for the associated battery power source. It likewise inserts between the partition wall 12b and the overhang of support posts 40. Spring clip terminal 34 also includes a centrally located downwardly extending finger 34a. This finger member is intended to insert within a retainer link 46 included on a separate spring contact 44, which retainer link extends through an associated aperture 42 in partition wall 12b. Spring clip terminal 34 further includes a centrally located and downwardly extending finger member 34b in cantilever fashion that provides the electrical contact with and serves as the positive terminal for the battery power source. Further, spring clip member 44 also has a spring cantilever mounted finger contact 48 which is intended to make contact with an associated terminal 50 on chassis assembly 14. In this manner, positive voltage is applied from the associated battery power source through terminals 34, 44 and 50 to the electrical circuitry contained in chassis assembly 14. As previously mentioned, the negative side of the battery power source is connected to chassis ground through spring clip terminals 36 and retainer link 26.

These spring clip parts forming the chassis retention and battery terminal functions may be constructed of any suitable electrical conductive material that exhibits sufficient resiliency in operation. One such arrangement found suitable is to fabricate the parts of beryllium copper which is then plated with a thin layer of nickel.

One additional function is provided by spring clip members 34 and 36 in conjunction with still other component parts. That additional function is to connect the battery terminals to exterior battery charging apparatus. Battery charging terminals 52 and 54 are provided on the bottom of housing 12, substantially as shown, and are intended to contact the appropriate charging terminals (not shown) of the charging device when the portable unit 10 is inserted therein.

Figure 3:
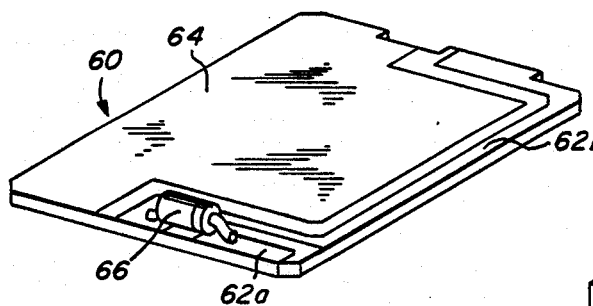
FIG. 3 is a plan view of the PC board intended for mounting within the battery compartment providing electrical continuity between the battery terminal contacts and the battery charging contacts on the bottom of the radio housing.

These charging terminals 52 and 54 must be in electrical contact with the appropriate battery terminals to effect this purpose. This is accomplished by utilizing the separate printed circuit board 60 as illustrated in FIG. 3. Board 60 is intended to insert within battery compartment 12a and overlie ledges 12c. Board 60 includes metal plating on one side thereof. This plating is in the form of narrow conductive strip 62 along one side thereof, as shown, as well as a much broader area 64 providing a similar conductive path but covering substantially all of the surface area and electrically isolated from the associated strip 62. Strip 62 is segmented, with portion 62b separate but bridged to portion 62a by a diode 66.

It will also be noted that spring contact terminal 34 has a laterally and upwardly extending resilient finger member 34c. Spring clip member 36 has a similar resilient finger member 36c. Accordingly, when PC board 60 is placed in the battery compartment 12a, electrical continuity is established between contact 52, conductive strip segment 62a, diode 66, conductive strip segment 62b and finger contact 34c. Electrical contact is then established between the positive terminal of the associated battery source to contact 52. Similarly, electrical continuity is established between contact 54, conductive plating 64 and finger contact 36c. Terminal 36 is in intimate contact with the negative terminal of the associated battery power source. In this manner, the batteries internal of housing 12b may be charged through associated contacts 52 and 54 by simply inserting the radio unit 10 in a suitable battery charger unit (not specifically shown).

Accordingly, a radio unit has been shown and described which includes an improved chassis and retention arrangement wherein a multi-functional spring clip assembly is utilized to serve as an electrical contact interface between an included battery power source while serving to retain the electrical chassis assembly within the housing. Mechanical screw parts are completely avoided, piece parts are effectively reduced and manufacturing costs minimized. At the same time service life and reliability are substantially enhanced.

Accordingly, what is claimed is:

1. A combined chassis retention and electrical contact assembly especially suited for a portable hand held battery powered device, including in combination:
   a housing;
   an electrical chassis insertable in said housing; and
   hand removable spring clip means for retaining said chassis within said housing,
   said spring clip means further serving as the electrical contacts between batteries insertable in said housing and said electrical chassis.

2. A combined chassis retention and electrical contact assembly in accordance with claim 1 wherein said chassis includes at least one retainer link, a portion of which is insertable through an aperture in a partition wall in said housing and wherein said link accommodates the insertion of a associated retainer spring clip.

3. A combined chassis retention and electrical contact assembly in accordance with claim 2 wherein said spring clip means includes a battery terminal serving as a negative battery terminal and slideably retained on one side of said partition wall and which includes an aperture aligned with said partition wall aperture through which said chassis retainer link portion extends from the opposite side of said partition wall to accommodate the insertion of said retainer spring clip.

4. A combined chassis retention and electrical contact assembly in accordance with claim 2 wherein said spring clip means includes a battery terminal serving as the positive battery terminal and slideably retained on one side of said partition wall and an additional spring clip contact on the other side of said partition wall which includes a retainer link extending through said partition wall and accommodating the insertion of an integral finger member on said battery terminal, said additional spring clip contact serving to provide electrical continuity from said positive battery terminal to said electrical chassis.

5. A combined chassis retention and electrical contact assembly in accordance with claim 1 wherein an additional pair of battery charging contacts are provided on the exterior of said housing with means internal of said housing effecting electrical continuity between said additional pair of battery charging contacts and said spring clip means serving as the electrical contacts to said insertable batteries.

6. A combined chassis retention and electrical contact assembly in accordance with claim 5 wherein said electrical continuity effecting means includes a printed circuit board insertable in said battery compartment with separate conductive paths for interconnecting a respective one of said battery charging contacts to one of said electrical contacts serving as the battery terminals.

7. A combined chassis retention and electrical contact assembly in accordance with claim 1 wherein said spring clip means is constructed of beryllium copper plated with nickel.

* * * * *